UNITED STATES PATENT OFFICE 2,679,524

OXYPROPYLATED ESTERS OF SULFO-POLYCARBOXYLIC ACIDS

Melvin De Groote, University City, Mo., assignor to Petrolite Corporation, a corporation of Delaware No Drawing. Application January 29, 1951, Serial No. 208,440

7 Claims. (Cl. 260—481)

The present invention is concerned with certain new products, compounds or compositions of matter which are essentially fractional ester salts of a tribasic acid in which two carboxyl radicals appear in ester form and sulfo radical appears in a salt form. Such compounds are derived preferably by reaction between three types of reagents; (a) polypropylene glycol of a molecular weight sufficient to give water-insolubility and kerosene-solubility, generally being in the molecular weight range of 750 to approximately 3,000; (b) a dicarboxy compound selected from the class consisting of maleic acid (or anhydride), citraconic acid (or anhydride), and fumaric acid; and (c) an alkali metal bisulfite such as sodium bisulfite or potassium bisulfite.

The present application is a continuation-in-part of my copending application, Serial No. 186,681, filed September 25, 1950, now Patent 2,602,054.

The preparation of the compounds or products previously described involves substantially two steps: (a) esterification between two moles of the polypropylene glycol and one mole of a dicarboxy compound such as maleic anhydride, and (b) reaction of such fractional ester with a suitable alkali metal bisulfite such as sodium bisulfite.

More specifically, the present invention is concerned with certain hydrophile products of the kind described; said hydrophile synthetic products being characterized by the following formula

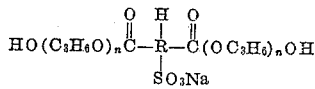

in which

is the divalent radical of an unsaturated dicarboxy acid selected from the class consisting of maleic acid, fumaric acid, and citraconic acid, and $n$ is a whole number varying from 12 to 80, and with the proviso that the polypropylene glycol prior to esterification be water-insoluble and kerosene-soluble.

In the above formula the alkali metal cation is shown as sodium which is the cheapest and most readily available. Needless to say, any other alkali metal cation, such as potassium, may be employed in the form of potassium bisulfite and is included in the hereto attached claims as the obvious chemical equivalent. Similarly, ammonium bisulfite may be employed instead of sodium or potassium bisulfite. This applies also to a bisulfite of various organic bases provided, of course, that such bases prior to forming a sulfite are as basic as ammonia and that the sulfite is water-soluble. All these are the obvious functional equivalents of sodium bisulfite. The procedure is illustrated by the following example:

Example 1

In a reaction flask there were placed 8 grams of maleic anhydride, 305 grams of propylene glycol 2025 (molal ratio of glycol to anhydride 2:1) along with approximately 1% of toluene sulfonic acid. In this instance 3 grams were used. There was also added 50 cc. of xylene. Heat was applied and refluxing permitted to continue for about three hours. The maximum temperature during the reflux period was approximately 145° C. The amount of water which distilled over was about 1 cc. At the end of the reaction there was still a slight acidity due to uncombined maleic acid radicals and the presence of the acid catalyst. A small amount of 30% aqueous caustic soda was added until sufficient had been introduced to neutralize the free sulfonic acid radicals and the free carboxylic acid radicals. After this adjustment, 8 grams of powdered sodium bisulfite were added. Apparently enough water had been added along with the caustic soda to dissolve at least part of the sodium bisulfite so that further addition of water was not required. Needless to say, if no caustic soda solution was used to neutralize the acidity, then a little water should be added to dissolve at least part or all of the sodium bisulfite so as to give a saturated solution. The reaction mixture was stirred and heated for 3 hours. No effort was made to have any reflux take place during this stage of the reaction for the obvious reason that if water were removed and the sodium bisulfite were anhydrous there would be little or no opportunity for reaction. This was necessary also for the reason that sodium bisulfite begins to decompose at about 100° C. and this reaction obviously must be conducted at a suitable temperature until the sodium bisulfite has combined. Thereafter the xylene can be distilled over in the usual manner, removing any water with it and all the xylene can be removed by distillation, particularly vacuum distillation.

The same procedure was followed in connection with a number of additional samples, all of which are illustrated in the following table which gives the reactants, amounts employed, temperature of esterification, etc.

In the various examples preceding only one glycol has been used in these cases. Actually

TABLE 1

| Ex. No. | M. W. of Poly-propylene glycol | Amt. Used (grs.) | Di-carboxy Reactant | Amt. Used (grs.) | Xylene (ccm.) | Max. Ester-ification Temp. (° C.) | Ester-ification time (hrs.) | Sod. Bisulfite (grs.) | Max. Reaction Temp., ° C. | Reaction Time (hrs.) |
|---|---|---|---|---|---|---|---|---|---|---|
| 1 | 2,025 | 305 | Maleic Anhydride | 8 | 50 | 145 | 3½ | 8 | 80–95 | 3 |
| 2 | 725 | 115 | ---do--- | 8 | 40 | 140 | 3½ | 8 | 80–95 | 3½ |
| 3 | 1,025 | 155 | ---do--- | 8 | 43 | 139 | 4 | 8 | 80–95 | 4½ |
| 4 | 2,525 | 375 | ---do--- | 8 | 60 | 143 | 4 | 8 | 80–85 | 3½ |
| 5 | 1,525 | 230 | ---do--- | 8 | 45 | 140 | 3½ | 8 | 80–95 | 4 |
| 6 | 2,025 | 300 | Citraconic Anhydride | 9 | 50 | 142 | 3¾ | 8 | 80–95 | 4¼ |
| 7 | 725 | 115 | ---do--- | 9 | 40 | 139 | 4 | 8 | 80–95 | 3½ |
| 8 | 1,025 | 155 | ---do--- | 9 | 43 | 144 | 3¾ | 8 | 80–95 | 3 |
| 9 | 2,525 | 375 | ---do--- | 9 | 60 | 145 | 3½ | 8 | 80–95 | 4 |
| 10 | 1,525 | 230 | ---do--- | 9 | 45 | 140 | 3½ | 8 | 80–95 | 4¼ |

Polypropylene glycols are commercially available. Such polypropylene glycols are furnished in various molecular weight ranges. The water-insoluble, kerosene-soluble polypropylene glycols begin in the molecular weight range somewhere above 500, and more specifically, at about 700 or 750. The molecular weight was usually determined by the hydroxyl method. Such hydroxyl molecular weight is a fraction, sometimes a large major fraction, of the theoretical molecular weight based on the method of synthesis, i. e., the calculated molecular weight based theoretically on the value one would expect to obtain by treating water or propylene glycol, for example, with propylene oxide. Needless to say, one does not obtain a single compound but a propylene glycol of a molecular weight ratio of 750 or 1,000 or 2,000 as the case may be, and really represents a cogeneric mixture whose statistical average molecular weight is the one indicated. Reference in the table is, of course, to hydroxyl value molecular weight for the obvious reason that this is the basis for calculating the amount of reactants required.

In all instances a small amount of 30% caustic soda solution was used as in the more complete description of Example 1; and also an amount of toluene sulfonic acid, approximately 1% of the weight of the glycol, or slightly less, was used in the esterification step. The larger amount should not be used because there may be a decomposition of the glycol. Smaller amounts can be used, for instance, ½% or ¾% based on amount of glycol, provided, however, that the esterification time is extended somewhat.

The products obtained are comparable to the initial glycol in appearance, etc., i. e., usually they are an amber color or at least of a slight straw color, and often somewhat thicker than the original glycol. This description, of course, applies to materials after the removal of the solvent, i. e., the xylene. For use as demulsifiers there is no need to remove the xylene and it may remain behind. Obviously other liquids than xylene may be used in esterification procedure. However, if the boiling point is any higher than xylene there is danger that decomposition may take place unless the amount of sulfonic acid is reduced. Other catalysts such as a small amount of dry hydrochloric acid can be used but it appears less desirable than the sulfonic acid. Needless to say, the caustic soda solution used neutralizes the sulfonic acid catalyst present.

The equipment used in esterification procedure is a resin pot of the kind described in U. S. Patent No. 2,499,370, dated March 7, 1950, to De Groote and Keiser. Any conventional equipment can be used, either on a small scale, pilot plant scale, or larger scale.

there is no reason why one may not use two different glycols, for instance, an equimolar mixture of two glycols, one for example having a molecular weight of 2000 and the other 3000; or one having a molecular weight of 1500 and the other 2500. Actually these glycols are cogeneric mixtures at each selected molecular weight. If one does make a mixture of the kind here described actually three types of compounds will appear, one type in which both polycarboxy acid radicals are joined with the higher molecular weight glycol, one type where both carboxyls are joined with the lower molecular weight glycol, and one type where one carboxyl is united to a higher molecular weight glycol and the other one to a lower molecular weight glycol.

The products so obtained are peculiar (a) insofar that there is not present any radical having 8 or more uninterrupted carbon atoms, and (b) the compounds are not particularly effective as surface-active agents in the ordinary sense due either to the large molecular size or the absence of a hydrophobe radical of the kind previously referred to, or for some other reason which is obscure. The chemical compounds herein employed as demulsifiers have molecular weights varying from more than 1000 up to several thousands, for instance, 5000, 6000 or 7000, and yet contain only one sulfo radical. Utility of such compounds for industrial uses is rather unusual. They are not effective emulsifying agents but are useful for other purposes. For example, they are valuable as an additive or a promoter of emulsions. These compounds also have hydrotropic property and serve as common solvents in the preparation of micellar solutions. It is to be noted that they are free from terminal carboxyl radicals and thus differ from reagents obtained, for example, by treating one mole of a high molal polypropylene glycol with 2 moles of a dicarboxy acid.

As pointed out in the aforementioned co-pending application, Serial No. 186,681, filed September 25, 1950, new Patent 2,602,054, products of the kind above described are suitable for demulsification of petroleum emulsions of the water-in-oil type. Said aforementioned co-pending application is directly concerned with this phase of the invention. However, the utility of these compounds is not limited to this particular field of application but I have found they are useful for other purposes, such as the following, and particularly as additives in the preparation of emulsions. Extremely dilute emulsions, for instance, those in which the dispersed phase is less than two-tenths of a per cent, and usually less than one tenth of a per cent, have been prepared without using an emulsifying agent. The majority of emulsions, however, are prepared by the use of an emulsifying agent, and thus the emulsion system consists essentially of three ingredients. However, many technical emulsions actually have a fourth ingredient which may be an emulsifier of indifferent or inferior effect, but is valuable because it is a coupling agent or mutual solvent. See "The Composition and Structure of Technical Emulsions," J. H. Goodey, Royal Australian Chem. Inst. J. and Proc., 16, 1949, pp. 47–75.

Other uses involve these compounds as break-inducers in the doctor treatment of sour hydrocarbons, as additives to lubricating oils of both the naturally-occurring petroleum type of lubricant and also synthetic lubricants which in many instances are largely polymerized alkylene oxides as described in U. S. Patent No. 2,448,664, dated September, 7, 1948, to Fife et al.

Having thus described my invention what I claim as new and desire to secure by Letters Patent, is:

1. Hydrophile synthetic products; said hydrophile synthetic products being characterized by the following formula:

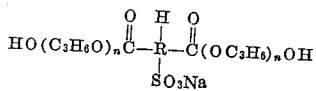

in which

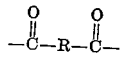

is the divalent radical of an unsaturated dicarboxy acid selected from the class consisting of maleic acid, fumaric acid, and citraconic acid and has a structure selected from the class consisting of

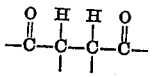

and

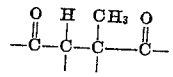

structures, and $n$ is a whole number varying from 12 to 80, and with the proviso that the polypropylene glycol prior to esterification be water-insoluble and kerosene-soluble 2. The product of claim 1 wherein the dicarboxy acid is maleic acid.

3. The product of claim 1 wherein the dicarboxy acid is maleic acid and the value of $n$ corresponds to a polypropylene glycol of approximately 700 molecular weight.

4. The product of claim 1 wherein the dicarboxy acid is maleic acid and the value of $n$ corresponds to a polypropylene glycol of approximately 1000 molecular weight.

5. The product of claim 1 wherein the dicarboxy acid is maleic acid and the value of $n$ corresponds to a polypropylene glycol of approximately 1500 molecular weight.

6. The product of claim 1 wherein the dicarboxy acid is maleic acid and the value of $n$ corresponds to a polypropylene glycol of approximately 2000 molecular weight.

7. The product of claim 1 wherein the dicarboxy acid is maleic acid and the value of $n$ corresponds to a polypropylene glycol of approximately 2500 molecular weight.

References Cited in the file of this patent

UNITED STATES PATENTS

| Number | Name | Date |
| --- | --- | --- |
| 2,072,085 | De Groote et al. | Mar. 2, 1937 |
| 2,184,794 | De Groote | Dec. 26, 1939 |
| 2,301,609 | Bonnet | Nov. 10, 1942 |
| 2,305,067 | De Groote | Dec. 15, 1942 |